No. 623,125. Patented Apr. 18, 1899.
S. R. BAILEY.
PERCH CONNECTION FOR CARRIAGES.
(Application filed Dec. 29, 1898.)
(No Model.)
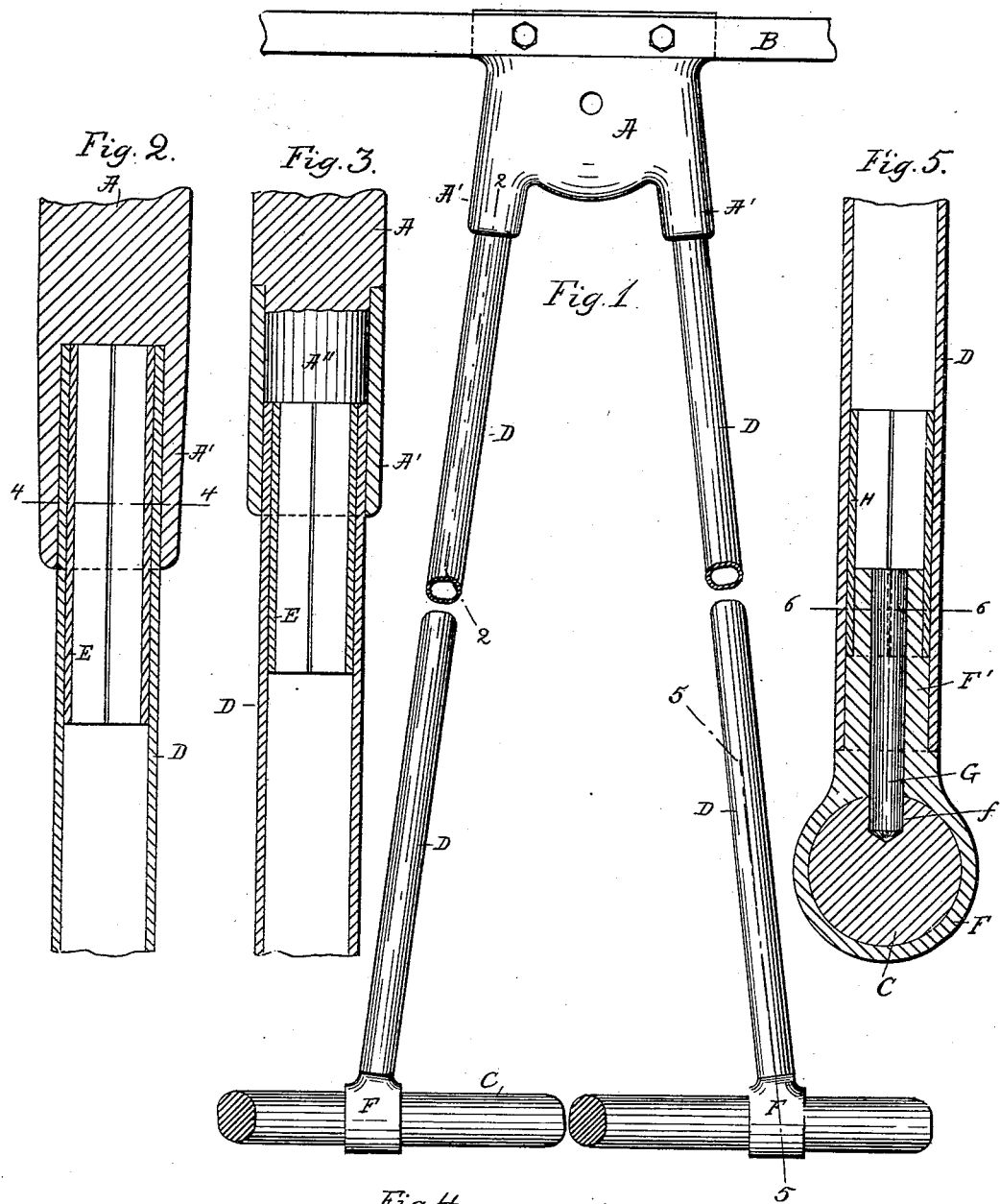
Witnesses
Karl A. Andrén
William W. Lummus
Inventor
Samuel R. Bailey
by Alban Andrén
his atty.

UNITED STATES PATENT OFFICE.

SAMUEL R. BAILEY, OF AMESBURY, MASSACHUSETTS.

PERCH CONNECTION FOR CARRIAGES.

SPECIFICATION forming part of Letters Patent No. 623,125, dated April 18, 1899.

Application filed December 29, 1898. Serial No. 700,670. (No model.)

*To all whom it may concern:*

Be it known that I, SAMUEL R. BAILEY, a citizen of the United States, residing at Amesbury, in the county of Essex and State of Massachusetts, have invented new and useful Improvements in Perch Connections for Carriages, of which the following is a specification.

This invention relates to improvements in perch connections for carriages; and it has for its object to firmly secure the ends of the tubular metal perches, respectively, to the fifth-wheel and rear axle, as will hereinafter be more fully shown and described, reference being had to the accompanying drawings, wherein—

Figure 1 represents a top plan view of the perches and rear axle and fifth-wheel of a carriage to which they are connected. Fig. 2 represents an enlarged longitudinal section on the line 2 2, shown in Fig. 1. Fig. 3 represents a similar longitudinal section showing a modified form of the perch connection to the fifth-wheel. Fig. 4 represents a cross-section on the line 4 4, shown in Fig. 2. Fig. 5 represents an enlarged longitudinal section on the line 5 5, shown in Fig. 1; and Fig. 6 represents a cross-section on the line 6 6, shown in Fig. 5.

Similar letters refer to similar parts wherever they occur on the different parts of the drawings.

In the drawings, A represents the top part or cap of the metal fifth-wheel of a carriage, and B represents the spring secured in a suitable manner to such fifth-wheel portion.

C represents the rear axle of the carriage, as usual.

D D represent the tubular metal perches, which are secured firmly to the fifth-wheel portion A and rear axle C in a manner as will hereinafter be described. For the purpose of securing the forward end of each perch to the fifth-wheel portion A, I make on the latter, preferably integral with it, a cylindrical socket A' (one for each perch) of an internal diameter equal to the exterior diameter of the perch, as shown in Fig. 2. In practice I prefer to arrange within the forward end of the perch D a preferably-slitted reinforcing-sleeve E, as shown in Fig. 2, which sleeve serves to strengthen the union between the perch end and the socket on the fifth-wheel, thus preventing any liability to breakage at such place of connection.

The parts after being placed in position, as shown in Fig. 2, are brazed together, preferably by suitable hard alloy or solder, by which they are effectually secured and united together.

In Fig. 3 I have shown a modification of the invention, in which the perch-receiving socket A' instead of being made integral with the fifth-wheel portion A is made separate and brazed onto a trunnion A'' on the fifth-wheel portion A, as shown in said Fig. 3.

Although I prefer to use the reinforcing-sleeve E on the interior of the perch at the place where the forward end of the latter is connected to the fifth-wheel portion A, I wish to state that I may, if so desired, dispense with such reinforcing-sleeve without departing from the essence of my invention of securing the front ends of the perches to the fifth-wheel portion.

The device for securing the rear ends of the perches to the axle C is constructed as follows: I make use of a short tube, sleeve, or ring F, within which the axle C is introduced, as shown in Figs. 1 and 5. In one piece with said sleeve F is made a cylindrical shank F', adapted to be received in the rear end of the perch D, as shown in Fig. 5. The said shank F' is made tubular, and centrally within it is driven a pin G, the lower end of which is received in a cylindrical recess *f* in the axle C, as shown in Fig. 5. In practice I prefer to interpose between the interior of the rear end of each perch D and the reduced forward end of the shank F' a preferably-slitted reinforcing-sleeve H for a purpose similar to that of the reinforcing-sleeve E in the forward ends of the perches, as shown in Fig. 5; but, if so desired, I may dispense with such reinforcing-sleeve without departing from the spirit of my invention. After the sleeve or ring F has been located in proper position on the axle C and the end of the tubular perch D placed over the shank F' on said sleeve or ring and the pin or bolt G inserted through the shank F' and into the recess in the axle C the parts are brazed together by suitable hard solder or alloy, by which a firm and secure union between the parts is obtained.

The pin G, which connects the shank F' to the axle C, serves as an aid to firmly secure the sleeve or ring F to the axle C when the parts are brazed together.

Having thus fully described the nature, construction, and operation of my invention, I wish to secure by Letters Patent and claim—

The herein-described perch connection for securing one end of a carriage-perch to the axle, consisting of a metal ring or sleeve F surrounding the axle and having a tubular shank F' adapted to receive the rear end of the perch D, a pin or projection $f$ inserted in said tubular shank and projected into a corresponding recess in the axle, and securing said parts by brazing them together, substantially as and for the purpose set forth.

In testimony whereof I have hereunto set my hand in presence of two subscribing witnesses.

SAMUEL R. BAILEY.

Witnesses:
ALBAN ANDRÉN,
KARL A. ANDRÉN.